United States Patent
Wiethorn

(10) Patent No.: US 11,288,897 B2
(45) Date of Patent: Mar. 29, 2022

(54) CRANE RISK LOGIC APPARATUS AND SYSTEM AND METHOD FOR USE OF SAME

(71) Applicant: Jim D. Wiethorn, Sugar Land, TX (US)

(72) Inventor: Jim D. Wiethorn, Sugar Land, TX (US)

(*) Notice: Subject to any disclaimer, the term of this patent is extended or adjusted under 35 U.S.C. 154(b) by 0 days.

(21) Appl. No.: 17/407,442

(22) Filed: Aug. 20, 2021

(65) Prior Publication Data

US 2022/0058890 A1 Feb. 24, 2022

Related U.S. Application Data

(60) Provisional application No. 63/068,232, filed on Aug. 20, 2020.

(51) Int. Cl.
| | |
|---|---|
| *G07C 3/02* | (2006.01) |
| *B66C 13/46* | (2006.01) |
| *B66C 13/16* | (2006.01) |
| *G08B 21/18* | (2006.01) |
| *G06Q 10/00* | (2012.01) |

(Continued)

(52) U.S. Cl.
CPC ............... *G07C 3/02* (2013.01); *B66C 13/16* (2013.01); *B66C 13/46* (2013.01); *B66C 15/00* (2013.01); *G06Q 10/06398* (2013.01); *G06Q 10/20* (2013.01); *G08B 21/18* (2013.01)

(58) Field of Classification Search
CPC ........... G07C 3/02; B66C 13/16; B66C 13/46; B66C 15/00; G06Q 10/06398; G06Q 10/20; G08B 21/18
See application file for complete search history.

(56) References Cited

U.S. PATENT DOCUMENTS

| | | |
|---|---|---|
| 4,222,491 A | 9/1980 | Geppert |
| 7,482,973 B2 | 1/2009 | Tucker et al. |

(Continued)

FOREIGN PATENT DOCUMENTS

EP 3059200 8/2016

OTHER PUBLICATIONS

InnovationQ Plus—IP.com, First Current Assignees by Relevance, https://iq.ip.com/discover, accessed Nov. 13, 2020.

(Continued)

*Primary Examiner* — Ig T An
(74) *Attorney, Agent, or Firm* — Scott T. Griggs; Griggs Bergen LLP

(57) ABSTRACT

A crane risk logic apparatus and system and method for use of the same are disclosed. In one embodiment of the crane risk logic apparatus, the crane risk logic apparatus is integral with a crane, such as a mobile or crawler crane or a tower crane, and located in communication with a load moment indicator. The crane risk logic apparatus receives crane data from the load moment indicator and determines various data analytics, such as, lift angle data, allowable capacity data, operator override data, anti-two-block activation data, operational time data, lift cycle count data, lift classification data, slewing speed data, wind speed data, warning message data, error message data, and winch direction and speed data for each crane lift cycle. The data analytics may be utilized to inform a crane operator evaluation or a crane maintenance schedule for the crane, for example.

15 Claims, 4 Drawing Sheets

(51) Int. Cl.
*B66C 15/00* (2006.01)
*G06Q 10/06* (2012.01)

(56) References Cited

U.S. PATENT DOCUMENTS

| | | |
|---|---|---|
| 8,081,112 B2 | 12/2011 | Tucker et al. |
| 8,290,204 B2 | 10/2012 | Nielsen et al. |
| 9,081,109 B1 | 7/2015 | Olsson et al. |
| 9,292,813 B2 | 3/2016 | Tucker et al. |
| 9,542,824 B2 | 1/2017 | Beggs et al. |
| 9,547,969 B2 | 1/2017 | Beggs et al. |
| 9,607,496 B2 | 3/2017 | Beggs et al. |
| 9,633,537 B2 | 4/2017 | Beggs et al. |
| 9,672,713 B2 | 6/2017 | Beggs et al. |
| 9,703,002 B1 | 7/2017 | Olsson et al. |
| 10,405,070 B2 | 9/2019 | Schwarzkopf et al. |
| 10,671,089 B2 | 6/2020 | Tojima et al. |
| 2002/0194160 A1* | 12/2002 | Garrow ............... G06Q 10/1097 |
| 2005/0247657 A1 | 11/2005 | Sparenborg |
| 2007/0284327 A1 | 12/2007 | Gonzalez et al. |
| 2010/0012610 A1* | 1/2010 | Rudy ................... B66C 23/905 212/270 |
| 2011/0062104 A1 | 3/2011 | Schneider et al. |
| 2011/0279261 A1 | 11/2011 | Gauger et al. |
| 2012/0138392 A1 | 6/2012 | Anasis et al. |
| 2013/0013251 A1* | 1/2013 | Schoonmaker ......... B66C 13/46 702/152 |
| 2014/0164039 A1 | 6/2014 | Mitti et al. |
| 2014/0200863 A1 | 7/2014 | Kamat et al. |
| 2015/0042479 A1 | 2/2015 | Muetzel et al. |
| 2015/0123476 A1 | 5/2015 | Mesia et al. |
| 2016/0200553 A1 | 7/2016 | Sorensen et al. |
| 2016/0224029 A1 | 8/2016 | Tojima et al. |
| 2016/0343140 A1 | 11/2016 | Ciprari et al. |
| 2017/0076233 A1 | 3/2017 | Finn et al. |
| 2017/0260028 A1 | 9/2017 | Verheyen et al. |
| 2017/0265029 A1 | 9/2017 | Drew et al. |
| 2018/0057319 A1 | 3/2018 | Hirate et al. |
| 2018/0218303 A1 | 8/2018 | Cole et al. |
| 2018/0346294 A1 | 12/2018 | Shely et al. |
| 2019/0031474 A1* | 1/2019 | Stilborn ................. B66C 13/16 |
| 2019/0241408 A1 | 8/2019 | Strahl et al. |
| 2019/0276281 A1 | 9/2019 | Hofmeister et al. |
| 2019/0325174 A1 | 10/2019 | Ashaari et al. |
| 2020/0255267 A1* | 8/2020 | Wong ..................... B66C 15/00 |
| 2020/0361751 A1 | 11/2020 | Persico |
| 2021/0122616 A1* | 4/2021 | Kumler ................... B66D 1/46 |

OTHER PUBLICATIONS

Patent Cooooperation Treaty (PCT), International Search Report (ISR), PCT/US2017/032471, dated Aug. 2, 2017.
European Patent Office (EPO), European Search Report (ESR), EP Serial No. 17796961.5, dated Apr. 24, 2019.
Patent Cooooperation Treaty (PCT), International Search Report (ISR), PCT/US2020/043883, dated Oct. 13, 2020.
O.N. Aneziris et al.; Towards Risk Assessment for Crane Activities, www.sciencedirect.com—Safety Science, accessed Oct. 13, 2020.
Patent Cooooperation Treaty (PCT), International Search Report (ISR), PCT/US2020/050202, dated Nov. 30, 2020.
Saeid Asadollahi et al., Geofencing-Based Safety System for High-Pressure Pipelines, www.researchgate.net, published Nov. 2018, accessed Nov. 30, 2020.

* cited by examiner

CRANE RISK LOGIC APPARATUS AND SYSTEM AND METHOD FOR USE OF SAME

PRIORITY STATEMENT & CROSS-REFERENCE TO RELATED APPLICATIONS

This application claims priority from U.S. Provisional Patent Application No. 63/068,232, entitled "Crane Risk Logic Apparatus and System and Method for Use of Same" and filed on Aug. 20, 2020, in the name of Jim D. Wiethorn; which is hereby incorporated by reference, in entirety, for all purposes.

TECHNICAL FIELD OF THE INVENTION

This invention relates, in general, to cranes and, in particular, to a crane risk logic apparatus and system and method for use of the same for mobile cranes, tower cranes, and the like, that enables crane owners, and operators to provide a means of evaluating crane use and operational procedures of the operator.

BACKGROUND OF THE INVENTION

An examination of accident data over the past thirty-five (35) years has provided critical data to aid crane forensics and the identification of causes of crane accidents—after the accidents have occurred. To better predict the likelihood of an accident before the accident occurs, a better understanding of the complex interactions between an operator, crane, and load are required. To achieve such an understanding, more operational data is required. Accordingly, there is a need for improved systems and methods to achieve these ends.

SUMMARY OF THE INVENTION

It would be advantageous to mitigate the risks of crane accidents in mobile cranes, tower cranes, and the like. It would also be desirable to enable a computer-based and mechanical-based solution that is easily and reliably deployed to collect data for the purposes of both crane use evaluation and operator evaluation. To better address one or more of these concerns, a crane risk logic (CRL) apparatus for cranes, and the like, and systems and methods for use of the same are disclosed. In one embodiment of the CRL apparatus, the CRL apparatus is integral with, and located in, mobile and tower cranes having a load moment indicator. The CRL apparatus receives crane data from mechanical devices and the load moment indicator and determines various data analytics, such as, lift angle data, allowable capacity data, operator override data, anti-two-block activation data, operational time data, lift cycle count data, lift classification data, slewing speed data, wind speed data, warning message data, error message data, and winch direction and speed data for each crane lift cycle. The data analytics may be utilized to perform a crane operator evaluation or develop a crane maintenance schedule for the crane, for example. A system and method, which accompany the CRL apparatus, are also disclosed. This CRL apparatus, along with the system and method and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of several specific ways to make and use the invention, and do not delimit the scope of the present invention.

Figure 1:
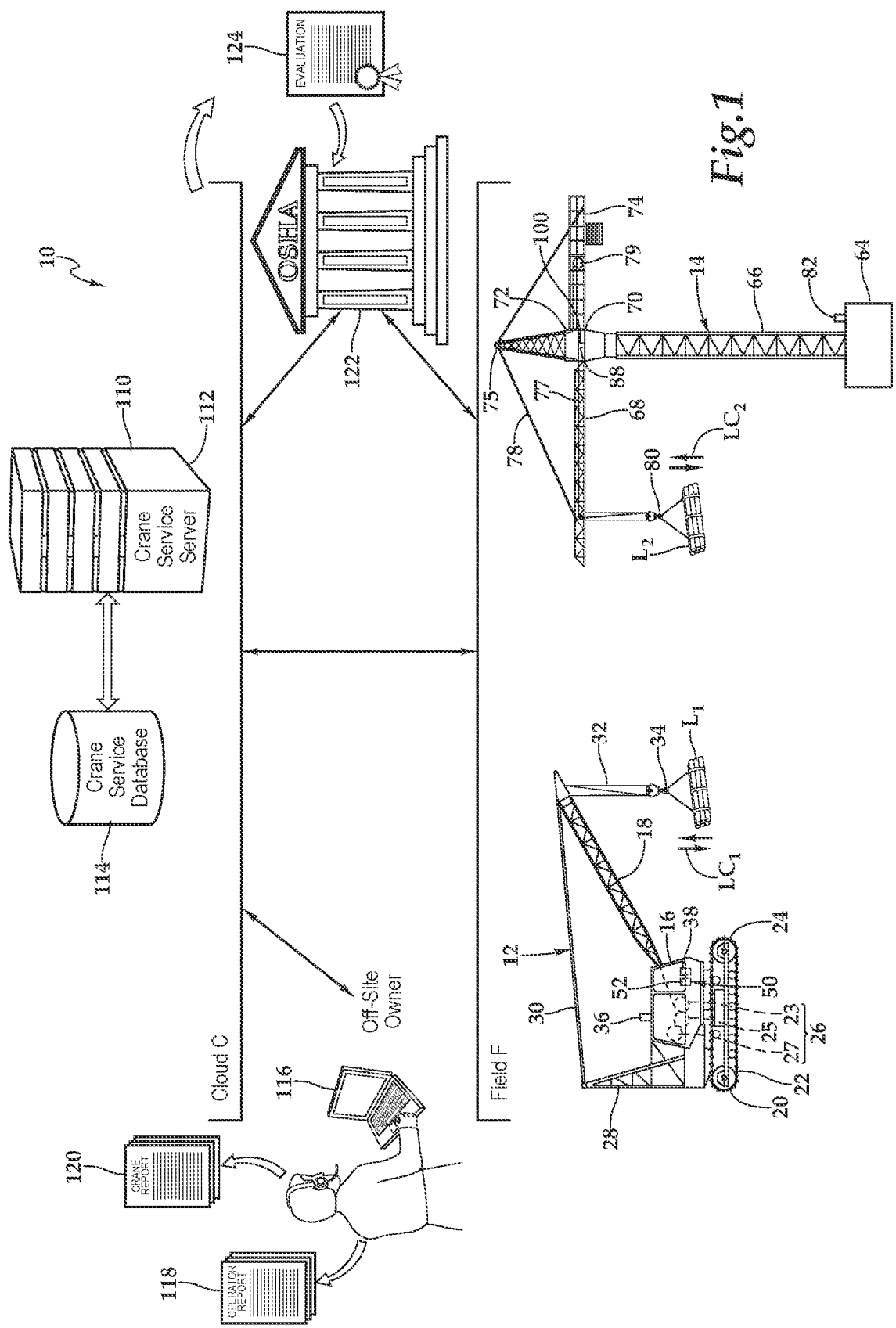
FIG. 1 is a schematic illustration depicting one embodiment of a system utilizing crane risk logic (CRL) apparatuses on multiple cranes, according to the teachings presented herein.

Referring initially to FIG. 1, therein is depicted one embodiment of a system for providing crane risk logic (CRL) that is schematically illustrated and generally labeled 10. A crawler crane 12 and a tower crane 14 are positioned in field F at a job site. It should be appreciated that although a crawler crane and a tower crane are depicted, the teachings presented herein work with any type of crane. As shown, the crawler crane 12 includes a crane body 16 having a boom 18 mounted thereto so as to be raised and lowered. Additionally, a lower undercarriage 20 with a set of parallel tracks 22 having endless treads 24 provide stability and mobility to the crawler crane 12. Winch assembly 26, which includes, in one embodiment, a boom hoist winch 23, a load line winch 25, and an auxiliary line winch 27, is also secured to the crane body 16 to drive the boom 18 to be raised and lowered through a gantry 28 and boom hoist assembly 30. In one implementation, a hoist cable 32 is drawn out of the boom hoist winch 23 along the boom 18 and is suspended from the extreme end of the boom 18 to suspend a hook 34 suspended by wire ropes. By the hoist means constituted as described above or an alternative thereto, the main winding and hoisting work for raising and lowering mainly a very heavy load $L_1$, depicted as beams, by lifting and then placing the load, thereby completing a lift cycle, which is identified as a lift cycle $LC_1$. Safety features, such as a siren 36 mounted on the top of the crane body 16, provide various notifications and precautions to improve safety when a load moment indicator (LMI) 38 is overridden or overloaded. It should be appreciated that although one embodiment of a winch assembly 26 is depicted, other configurations of winches are within the teachings presented herein and the winch design selected will depend on various crane engineering factors and intended operational capability of the crane.

The LMI 38 is secured to the crawler crane 12 to monitor crane functions to provide an operator of the crawler crane 12 with a continuous reading of a rated capacity of the crawler crane 12 as the crawler crane 12 and the boom 18 move through motions to make a lift of the load $L_1$ to complete the lift cycle $LC_1$. The severity of a load cycle is based on the relationship of the load weight to the allowable load permitted by the load chart and expressed as a percent capacity. The system 10 may detail the severity of each cycle based on the percent capacity of each cycle. A CRL apparatus 50 having a housing 52 is located integral with the crawler crane 12 and located in communication with the load moment indicator 38. As will be discussed in further detail hereinbelow, the CRL apparatus 50 collects crane data and crane analytics for monitoring and reporting purposes, and maintains the location of the crawler crane 12, among other applications.

The tower crane 14 includes a foundation 64 with a tower 66 extending therefrom. A jib 68 extends horizontally to the tower 66 so as to rotate in a horizontal plane under the power of a slewing unit 70 positioned on top of the tower 66. An operating cabin 72 sits above the slewing unit 70 and rotates with the jib 68. A counter jib 74 holds counterweights, a hoist motor, a hoist drum, and electronics, for example, to drive the hoisting and the other functions. The jib 68 is supported by a fixed pendant 78 secured at a tower top 75 to an attachment point on the jib 68. A wire rope hoist cable 77 is drawn out of a load line drum 79 with a motor located on the counter jib 74 and extends up/down the tower top 75 and along the jib 68 and is suspended from a trolley (not shown) that travels along the jib 68 to suspend a hook 80 suspended by multiple cables. By the hoist means constituted as described above, the main winding and hoisting work for raising and lowering mainly a very heavy load $L_2$, depicted as beams. From the point a load is lifted and lowered defines a lift cycle $LC_2$. The severity of a load cycle is based on the relationship of the load weight to the allowable load permitted by the load chart or LMI and expressed as a percent capacity. The system 10 may detail the severity of each lift cycle, such as the lift cycle $LC_1$ or the lift cycle $LC_2$, based on the percent capacity of each cycle as well as tracking other metrics.

An LMI 88 is secured to the tower crane 14 to monitor crane functions to provide an operator of the tower crane 14 with a continuous reading of a rated capacity of the tower crane 14 as the tower crane 14 and the jib 68 move through motions to make a lift of the load $L_2$ to complete the lift cycle $LC_2$. A CRL apparatus 100 is located integral with the tower crane 14 and located in communication with the load moment indicator 88. As will be discussed in further detail hereinbelow, the CRL apparatus 100 collects crane data and crane analytics for monitoring and reporting purposes and maintains the location of the tower crane 14.

As shown, a CRL server 110 having a housing 112 and access to a CRL database 114 provides an interface and functionality to the field F, including the CRL apparatus 50 associated with the crawler crane 12 and the CRL apparatus 100 associated with the tower crane 14. An off-site owner 116 is located in communication with the services offered by the CRL server in a cloud C. The off-site owner 116 may run various reports, such as an operator evaluation report 188 and a crane use report 120 to give visibility into how the crawler crane 12 or the tower crane 14 are being operated in the field F. This can also identify any potential hazardous operations or abuse as well as inform an operator evaluation or maintenance schedule for the crawler crane 12 and the tower crane 14.

As previously mentioned, an examination of accident data over the years has provided critical data in the identification of crane accidents. Non-accident data can also reveal some interesting and potentially critical factors associated with future incidents based on the historical operational practices by the crane operator and the maintenance schedule of the crane. Although it is clear that an off-site owner 116 cannot control every operational movement of the crane by the operator, nor can the off-site owner 116 know or control the thought process of the crane operator, a study of the operational movements of a crane through the load moment indicator 38 of the crawler crane 12 or the load moment indicator 88 of the tower crane 14, prior to accidents, can prevent accidents. That is, analysis of on-going non-accident operational data can be used to establish capabilities and traits of operators, as well as to document inherent risk factors and trends established by collecting this data over a period of time. The CRL apparatus 50 and the CRL apparatus 100 as well as the system 10 store ongoing data of operators and cranes during normal operations and evaluates performance for use by the off-site owner 116 to evaluate performance. In one implementation, the evaluation may also be used to satisfy certification or accreditation requirements as represented by a certification agency 122, which is depicted as, but not limited to, OSHA. As shown, the certification agency 122 may receive a certificate 124 relative to the evaluation of an operator or evaluation of a crane. The certificate 124 may be issued by a manager of the crane service server 112, for example, or another entity.

With respect to monitoring and reporting purposes, in operation, each of the CRL apparatuses 50, 100 receives crane data and, in particular, LMI data, from the respective load moment indicators 38, 88 and determines lift cycle data therefrom. In general, lift cycles are the number of times that a crane is loaded at a particular boom angle, lifts the load, and then releases the load at a second boom angle. Lift cycles become very critical once the load is 80% of the allowable load. Therefore, in one implementation, the CRL apparatus 50 interfaces with a load chart that forms a portion of the LMI data provided by the load movement indicator 38 at the crawler crane 12. The CRL apparatus 50 documents all lift cycles with particular attention to lift cycles over certain limits that can be preset by the crane owner. By way of example, the CRL apparatus 50 may categorize and count each lift cycle into 4 distinct levels of severity; namely, by way of example, Light (<70% capacity); Normal (70-90% capacity); Heavy (90-95% capacity); and Severe (>95% capacity). Precise documentation of the crane usage based on number and severity of lift cycles provides critical information for maintenance and inspection requirements. Additional information may be gathered for mobile cranes conducting low boom angle lifts. The low-boom angle limit is set by the owner and notifies them when a certain number (limit) have occurred. Similarly, this knowledge allows to control severe and abuse to the crane.

Figure 2:
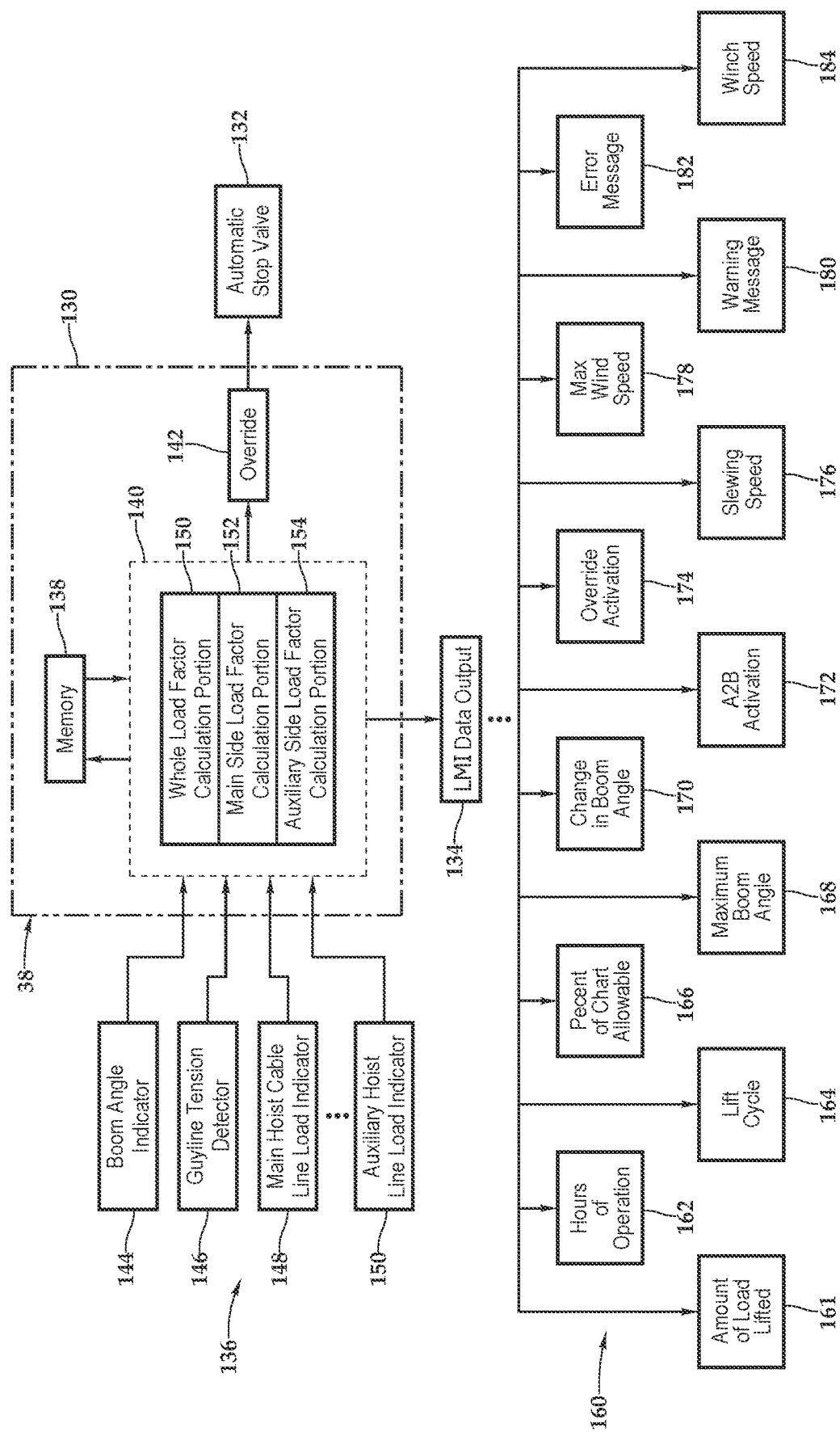
FIG. 2 is a functional block diagram depicting one embodiment of a load moment indicator shown FIG. 1, which may form a portion of the CRL apparatus.

Referring to FIG. 2, in one embodiment, the load moment indicator (LMI) 38 is constituted by a calculation processing portion 130, an automatic stop valve 132, an LMI data output 134, and one or more indicators 136. The calculation processing portion 130 may include a memory section 138, a load factor calculation section 140, and an override portion 141. Respective indicators 136 are provided and include, by way of example, a boom angle indicator 144 for detecting a boom angle, a guyline tension detector 146, a main hoist line load indicator 148 as a main winding hoist load detecting means for detecting a load (main side hoist load) of the hoist cable 32, and an auxiliary hoist line load indicator 150 as an auxiliary winding hoist load detecting means for detecting a load (auxiliary side hoist load) of auxiliary cabling and ropes. Detection values obtained by each of the indicators 136 are input to the load factor calculation section 140. It should be appreciated that although a particular configuration of detectors is presented, other detector configurations are within the teachings presented herein. By way of example and not by way of limitation, the speed of the winches and motors may be monitored by indicators for slewing and raising/lowering load measurements.

In one embodiment, the load factor calculation portion 140 may include a whole load factor calculation portion 150, a main side load factor calculation portion 152, and an auxiliary side load factor calculation portion 154. The load factors, such as hoist load/rated load, relative to the whole, main side and auxiliary side are calculated by these calculation portions 150, 152, 154. When the load factor reaches a predetermined value, an overload is judged by the override portion 141, and a stop signal is then sent to the automatic stop valve 132, which may be a solenoid valve, for example, and the crane operation automatically stops. It should be appreciated that although one architecture of the load moment indicator 38 is provided, other architectures are within the teachings presented herein. It should be appreciated that the load moment indicator 88 may be similar in structure and function to the load moment indicator 38.

By way of example and not by way of limitation, the following table, Table I, provides exemplary data sets, including crane data and data analytics, that are measured by the load moment indicator 38 and/or the CRL apparatus 50.

TABLE I

| LMI Data & Crane Data & Data Analytics | |
|---|---|
| Winch 1 (Main) | Load on the hook |
| | Winch in operation |
| | Raise or lowering winch speed |
| Winch 2 (Auxiliary) | Load on the whip line |
| | Winch in operation |
| | Raise or lowering winch speed |
| Boom angle | Angle of the boom |
| Luffing jib angle | Angle of the luffing jib |
| Interface with main line load chart | Load being lifted |
| | % capacity of the allowable |
| | Overload condition |
| | Override warning |
| Interface with whip line chart | Load being lifted |
| | % capacity of the allowable |
| | Overload condition |
| | Override warning |
| Wind speed | Anemometer reading |
| | Warning over 20 mph |
| | Warning over 25 mph |
| | Stop work over 30 mph |
| Anti-Two Block Activation | Date-Time of Activation |
| | Override notification |
| Lift Cycle Load | Take on load % capacity of lift boom angle 1-Let off load % capacity lift boom angle 2 |
| Actual load/Allowable load [Most defining cycles are above 80% of the load] | <70% Number of Light Cycles |
| | 70-90% Number of Normal Cycles |
| | 90-95% Number of Heavy Cycles |
| | >95% Number of Severe Cycles |

TABLE I-continued

| LMI Data & Crane Data & Data Analytics | |
|---|---|
| Hours of Operation | Time a crane has been working and available |
| Lift Cycle Number | Number of lift cycles |
| Lift Cycle Type | Type of lift cycles |
| Change in Boom Angle | Change in the angle of the boom |
| Override Activation | Interrupt the action of an automatic safety-related function |
| Slewing Speed | Angular movement of a crane boom or crane jib in a horizontal plane |
| Warning Message | Alert to the operator of a condition that might cause a problem |
| Error Message | Alert to the operator of an unexpected, problematic condition |
| Winch Speed | Speed and direction of a winch |

The LMI data output 134 may provide the CRL apparatus 50 with various data analytics 160. By way of example, and not by way of limitation, the data analytics 160 identified by the CRL apparatus 50 via the LMI data output 134 may include amount of load lifted 161, hours of operation data 162, lift cycle data 164, percent of allowable data 166, boom angle data 168, change in boom angle data 170, A2B activation data 172, override activation data 174, slewing speed data 176, wind speed data 178, warning message data 180, error message data 182, and winch direction and speed data 184. The amount of load lifted 161 may record the weight of loads in each of the lift cycles that is actually lifted. The hours of operation data 162 may define for each crane cycle the time the crane has been working and available. The lift cycle data 164 may include the number of lift cycles with for each of the crane lift cycle, the type/severity of lift cycles. The percent of allowable data 166 may include the percent of allowable load. The boom angle data 168 may include information about the angle of the boom. The change in boom angle data 170 may include the change in the boom angle. The A2B activation data 172 may include information about activation of an anti-two-block system, which is standard among all cranes. The override activation data 174 may include information about any overrides that occurred. The slewing speed data 176 may include information about the angular movement of a crane boom or crane jib in a horizontal plane as it relates to the suspended load. The wind speed data 178 may include information about the wind speed, maximum wind speed and direction during a lift cycle. The warning message data 180 may include information about various warning messages and, analogously, the error message data may include information about error messages. The winch direction and speed data 184 may include information about the speed and direction of the winch movement. Additionally, each of the various data analytics 160 may also include Global Positioning System (GPS) data such as date-stamped location.

Figure 3:
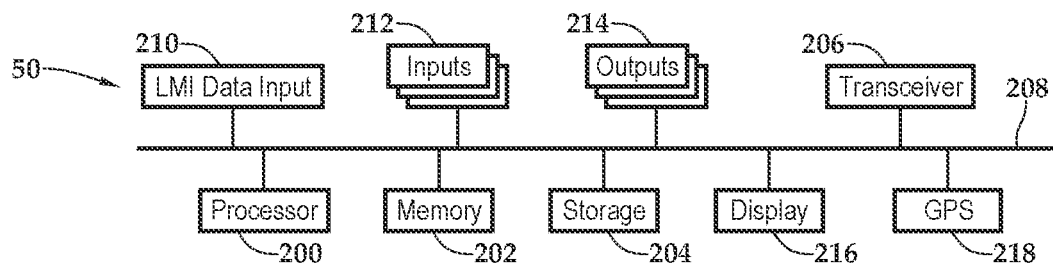
FIG. 3 is a functional block diagram depicting one embodiment of a CRL apparatus shown FIG. 1, according to the teachings presented herein.

Referring now to FIG. 3, within the housing 52, in one embodiment of the CRL apparatus 50, a processor 200, memory 202, storage 204, and one or more transceivers 206 are interconnected by a bus architecture 208 within a mounting architecture that supports an LMI data input 210, which is coupled to the LMI data output 134, inputs 212, outputs 214, a display 216, and a Global Positioning System (GPS) unit 218. It should be understood that the processor 200, the memory 202, the storage 204, the inputs 212, the outputs 214, the display 216, and the GPS 218 may be entirely contained within the housing 52. The processor 200 may process instructions for execution within the computing device, including instructions stored in the memory 202 or in the storage 204. The memory 202 stores information within the computing device. In one implementation, the memory 202 is a volatile memory unit or units. In another implementation, the memory 202 is a non-volatile memory unit or units. The storage 204 provides capacity that is capable of providing mass storage for the CRL apparatus 50. It should be appreciated that the CRL server 110 and CRL database 114 may provide additional storage capacity in the cloud C for the CRL apparatus 50. Various inputs 212 and outputs 214 provide connections to and from the computing device, wherein the inputs 212 are the signals or data received by the CRL apparatus 50, and the outputs 214 are the signals or data sent from the CRL apparatus 50.

The one or more transceivers, which are depicted as a transceiver 206, are associated with the CRL apparatus 50 and communicatively disposed with the bus 208. As shown, the transceiver 206 may be internal, external, or a combination thereof to the housing. Further, the transceiver 206 may be a transmitter/receiver, receiver, or an antenna for example. Communication between various devices and the CRL apparatus 50 may be enabled by a variety of wireless methodologies employed by the transceiver 206, including 802.11, 3G, 4G, Edge, WiFi, ZigBee, near field communications (NFC), Bluetooth low energy and Bluetooth, for example. The display 216, which is optional, provides an electronic device for the visual display of information. The GPS unit 218 accesses a global navigation satellite system that uses a receiver and algorithms to provide location, velocity and time synchronization to provide locationing information for the GPS unit 218, and, in turn, the CRL apparatus 50 and the crawler crane 12. It should be appreciated that although one architecture of the CRL apparatus 50 is provided, other architectures are within the teachings presented herein. Further, it should be appreciated that the CRL apparatus 100 is similar in structure and function to the CRL apparatus 50.

The memory 202 and the storage 204 are accessible to the processor 200 and include processor-executable instructions that, when executed, cause the processor 200 to execute a series of operations. In one embodiment of processor-executable instructions, the processor 200 is caused to receive the LMI data at the load moment indicator data input 210. The processor-executable instructions may then cause the processor to identify, based on the received crane data, for each of the crane lift cycle or an aggregate thereof, one or more of the following: the lift angle data, the allowable capacity data, the operator override data, the anti-two-block activation data, the operational time data, the lift cycle count data, the lift classification data, the slewing speed data, the wind speed data, the warning message data, the error message data, and the winch direction and speed data for each of the crane lift cycle or a number of crane lift cycles.

The processor 200 is then caused to store data analytics at the storage 204. The data analytics may be the lift angle data, the allowable capacity data, the operator override data, the anti-two-block activation data, the operational time data, the lift cycle count data, the lift classification data, the slewing speed data, the wind speed data, the warning message data, the error message data, or the winch direction and speed data. The processor-executable instructions may then cause the processor 200 to send the data analytics to a server, such as the CRL server 110 that may be cloud-based.

The processor-executable instructions presented hereinabove with FIG. 3 include, for example, instructions and data which cause a general purpose computer, special purpose computer, or special purpose processing device to perform a certain function or group of functions. Processor-executable instructions also include program modules that are executed by computers in stand-alone or network environments. Generally, program modules include routines, programs, components, data structures, objects, and the functions inherent in the design of special-purpose processors, or the like, that perform particular tasks or implement particular abstract data types. Processor-executable instructions, associated data structures, and program modules represent examples of the program code means for executing steps of the systems and methods disclosed herein. The particular sequence of such executable instructions or associated data structures represents examples of corresponding acts for implementing the functions described in such steps and variations in the combinations of processor-executable instructions and sequencing are within the teachings presented herein.

Figure 4:
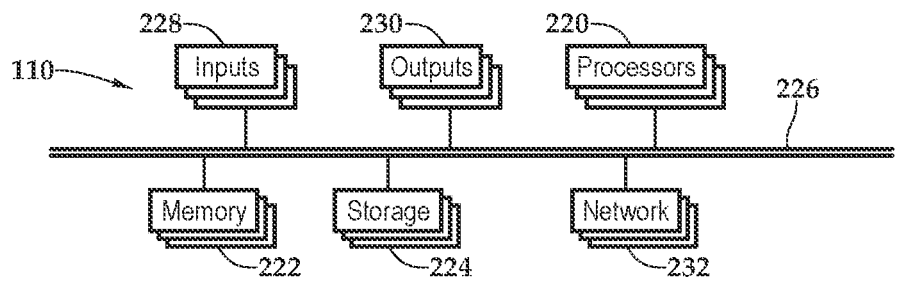
FIG. 4 is a functional block diagram depicting one embodiment of a server shown in FIG. 1, which may form a portion of the system.

Referring now to FIG. 4, one embodiment of the CRL server 110 as a computing device includes, within the housing 112, a processor 220, memory 222, and storage 224 interconnected with various buses 226 in a common or distributed, for example, mounting architecture that also supports inputs 228, outputs 230, and network interface 232. In other implementations, in the computing device, multiple processors and/or multiple buses may be used, as appropriate, along with multiple memories and types of memory. Further still, in other implementations, multiple computing devices may be provided and operations distributed therebetween. The processor 220 may process instructions for execution within the server 120, including instructions stored in the memory 222 or in storage 224. The memory 222 stores information within the computing device. In one implementation, the memory 222 is a volatile memory unit or units. In another implementation, the memory 222 is a non-volatile memory unit or units. Storage 224 includes capacity that is capable of providing mass storage for the CRL server 110, including CRL database storage capacity. Various inputs 228 and outputs 230 provide connections to and from the server 120, wherein the inputs 228 are the signals or data received by the CRL server 110, and the outputs 230 are the signals or data sent from the CRL server 110. The network interface 232 provides the necessary device controller to connect the CRL server 110 to one or more networks.

The memory 222 is accessible to the processor 220 and includes processor-executable instructions that, when executed, cause the processor 220 to execute a series of operations. The processor-executable instructions cause the processor 220 to provide an interface for an off-site crane owner. The processor-executable instructions also cause the processor 220 to maintain the CRL database 114 in the storage 224. As discussed, the CRL database 114 may include information about the crane owner, a crane operator of the crane, crane information, and job information. The processor 220 is caused to receive the crane data and the lift cycle data from the CRL apparatus 50 and append the crane data to the CRL database 124. The processor-executable instructions may cause the processor 220 to receive the data analytics from the CRL apparatus 50. In one embodiment, following the receipt of the data analytics, the CRL server 110 is caused via the processor 220 to evaluate the performance of the operator using the data analytics. In another embodiment, following the receipt of the data analytics, the CRL server 110 is caused via the processor 220 to evaluate the crane using the data analytics. The processor-executable instructions may cause the CRL server 110 to generate a report, such as the operator report 118 or the crane report 120.

The CRL server 110 and the CRL apparatus 50 provide an analysis of on-going non-accident operational data that can be used to establish capabilities and traits of operators, as well as to document inherent risk factors and trends established by collecting this data over a period of time. The CRL apparatus 50 stores ongoing data of operators during normal operations and with the use of the CRL server 110 evaluates performance for use by owners to evaluate their performance in accordance with various requirements, such as OSHA requirements. By way of example, with the CRL apparatus 50 and the CRL server 110, crane lifts are identified that are made below a specified angle which significantly increases the load in boom hoist wire ropes and its corresponding life. The owner is notified of improper operations and is able to intercede before the wire rope is damaged to failure. Currently, owners have no means of accurately determining the life of wire rope or guidance for proper inspection. By establishing the degree level of lift cycles (low, normal, heavy, or severe), a more definitive maintenance schedule can be established based on the type of use.

By way of further example, the CRL apparatus 50 and the CRL server 110 document the severity level of lifts that the operator conducts. The CRL apparatus 50 and the CRL server 110 collect the data of the normal percentage of allowable capacity of each lift and plots the normal-to-actual range of the lifts. Consistently high levels of percent allowable capacity can be addressed by crane placement or boom configuration. The CRL apparatus 50 and the CRL server 110 document the count of operator override of the load limiter, as well as the occurrence of anti-2-block (A2B) activation. A consistent overload and corresponding overriding the load limiting device requires attention by the owner to address with the operator.

The processor-executable instructions presented hereinabove with FIG. 4 include, for example, instructions and data which cause a general purpose computer, special purpose computer, or special purpose processing device to perform a certain function or group of functions. Processor-executable instructions also include program modules that are executed by computers in stand-alone or network environments. Generally, program modules include routines, programs, components, data structures, objects, and the functions inherent in the design of special-purpose processors, or the like, that perform particular tasks or implement particular abstract data types. Processor-executable instructions, associated data structures, and program modules represent examples of the program code means for executing steps of the systems and methods disclosed herein. The particular sequence of such executable instructions or associated data structures represents examples of corresponding acts for implementing the functions described in such steps and variations in the combinations of processor-executable instructions and sequencing are within the teachings presented herein.

Figure 5:
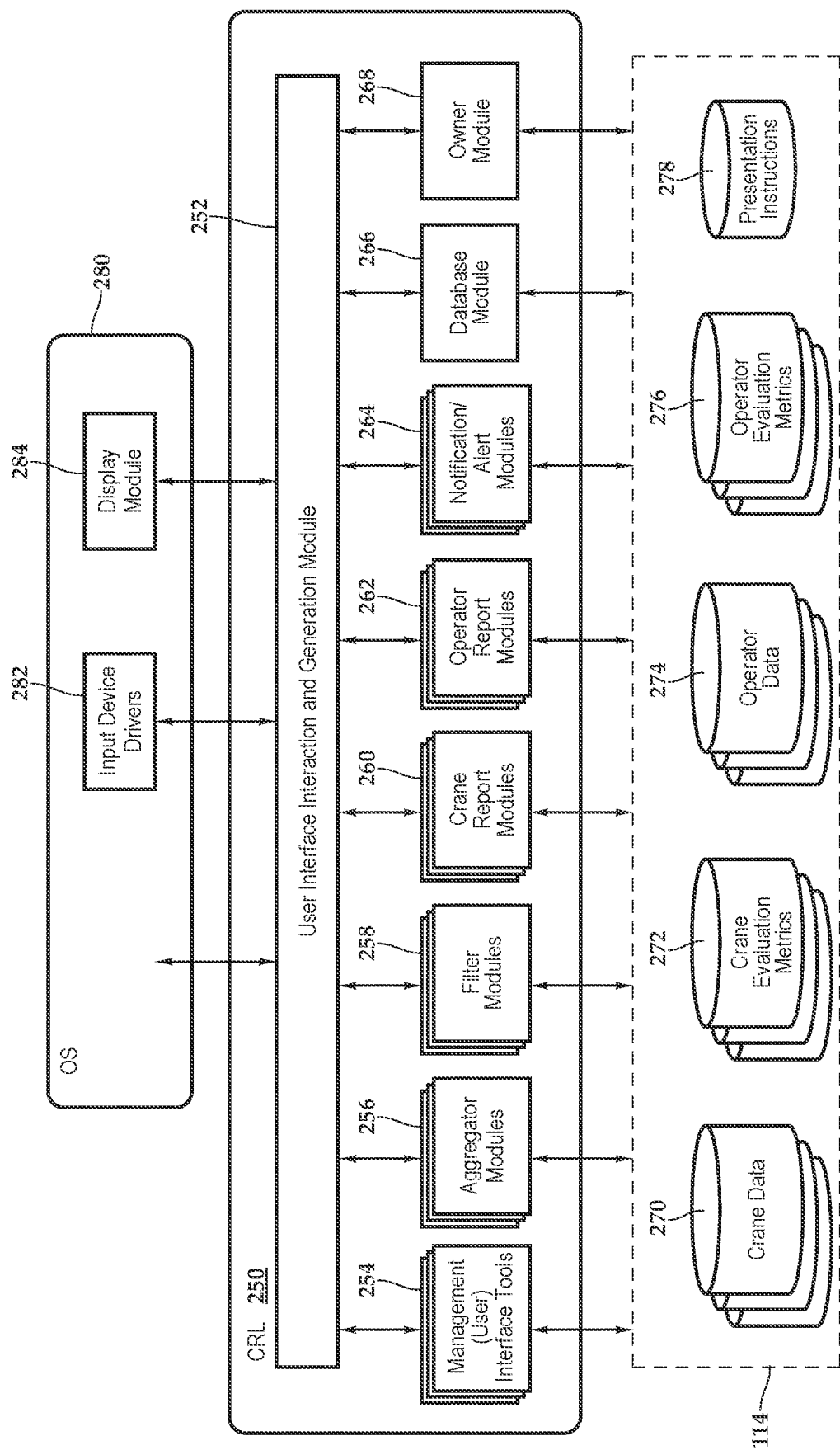
FIG. 5 is a conceptual module diagram depicting a software architecture of a CRL application of some embodiments.

FIG. 5 conceptually illustrates the software architecture of a CRL application 250 of some embodiments that may render information, such as the operator report 118 and the crane report 120. In some embodiments, the CRL application 250 is a stand-alone application or is integrated into another application, while in other embodiments the application might be implemented within an operating system 280. Furthermore, in some embodiments, the CRL application 250 is provided as part of a server-based solution or a cloud-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The CRL application 250 includes a user interface (UI) interaction and generation module 252, management (user) interface tools 254, aggregator modules 256, filter modules 258, crane report modules 260, operator report modules 262, notification/alert modules 264, a database module 266, and an owner module 268. The CRL application 250 has access to the CRL database 114, which in one embodiment, may include crane data 270, crane evaluation metrics 272, operator data 274, operator evaluation metrics 276, and presentation instructions 278, which presents instructions for the operation of the CRL application 250. In some embodiments, storages 270, 272, 274, 276, 278 are all stored in one physical storage. In other embodiments, the storages 270, 272, 274, 276, 278 are in separate physical storages, or one of the storages is in one physical storage while the other is in a different physical storage.

The CRL database 114, in one implementation, provides a database of all pertinent information required for crane lifts and historical information of the crane, owner, and operator. The crane data 270 may be all information concerning the make, model, and manufacturer of the crane as well as the date of manufacture. A copy of a current annual inspection/certification of the crane, a copy of all maintenance records, and documentation of the purchase of the crane, including current ownership information, may be included in the crane data 270. The crane evaluation metrics 272 include various standards for measuring the crane operation in a safe manner and maintaining the crane in a safe condition. The operator data 274 includes all the information of the operator assigned to the crane such as all experience and particularly certification documentation with a date of expiration. Recent "operator evaluation forms" may be included. The CRL server 120 may track the life and expiration of such forms and certificates to provide notifications prior to expiration when renewal is required. The operator evaluation metrics 276 include various standards for ensuring the crane is operated in a safe and workmanlike manner. The UI interaction and generation module 252 generates a user interface that allows the end user to specify parameters that may be utilized to generate various reports and notifications.

Once the parameters have been established for the generation of reports by default or by an end user utilizing the management (user) interface tools 254, the aggregator modules 256 and the filter modules 258 may be executed to analyze instances or summaries of LMI data and crane data gathered by the CRL application 250 by applying selected performance characteristic or selected performance characteristics to the instances of the LMI data and the crane data. The crane report modules 260 and operator report modules 162 may be executed to containerize and annotate the data elements to generate the required report or reports. The crane report modules 260 and operator report modules 162 may also assist an investigator or owner in the event of incident occurring as well as providing information on operator evaluation and crane maintenance. The cloud C and, in particular, the CRL database 114 captures and stores all data, which can be used to generate various reports to inform an evaluation. Additionally, by way of example, the crane report reports modules 260 may generate crane usage reports that allow an owner to determine actual hours of use for financial evaluation of each crane. By way of further example, the crane report modules 260 may also provide detailed records about the service times and hours of each crane. Such records may be an asset for insurances purposes and stored at a main office of the owner.

The notification/alert modules 262 may be executed to provide notifications of varying levels of urgency to the off-site owner 116 or the operator O at the field F, for example. The notifications and alerts may be weather related or job-site related or crane-related, for example. The database module 266 may be executed to obtain data from the CRL database 124. The owner module 268 provides the necessary interface or interfaces for the owner of the crane.

In the illustrated embodiment, FIG. 5 also includes an operating system 280 that includes input device driver(s) 282 and a display module 284. In some embodiments, as illustrated, the input device drivers 282 and display module 284 are part of the operating system 280 even when the analytics application 250 is an application separate from the operating system 280. The input device drivers 282 may include drivers for translating signals from a keyboard, mouse, touchpad, tablet, touch screen, gyroscope or accelerometer, for example. A user may use one or more of these input devices 282, which send signals to their corresponding device driver, in combination with the display module 284 to interact with the CRL application 250. The device driver then translates the signals into user input data that is provided to the UI interaction and generation module 252.

Figure 6:
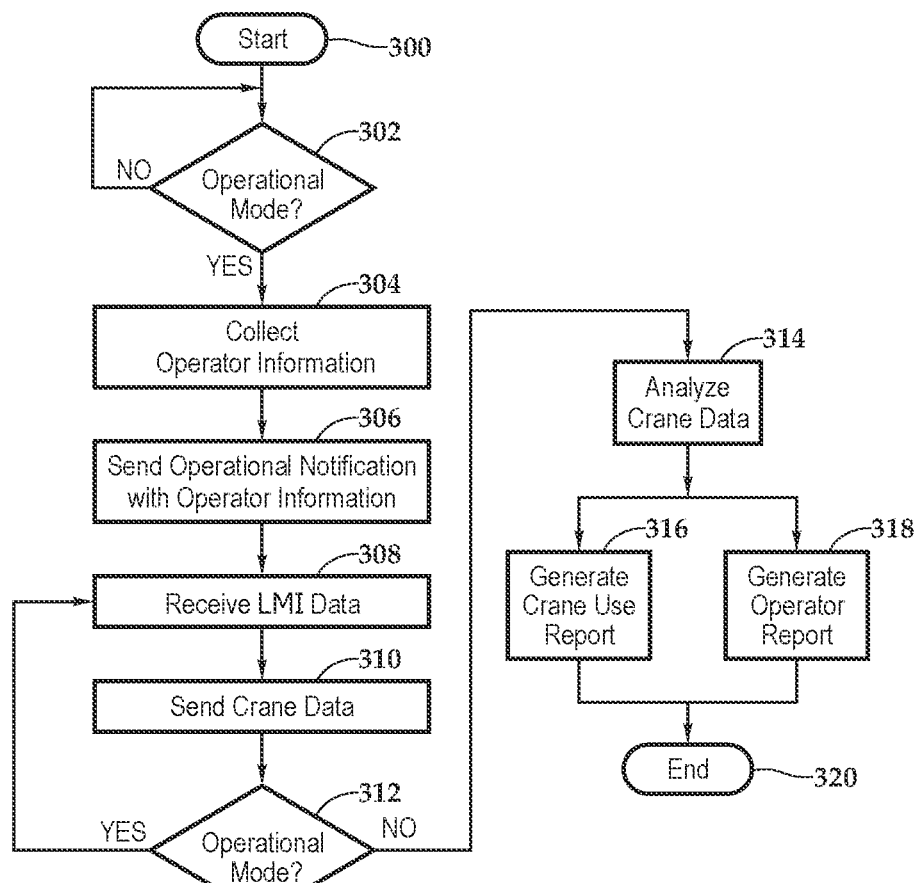
FIG. 6 is a flowchart depicting one embodiment of a method utilizing a CRL apparatus on a crane, according to the teachings presented herein.

Referring to FIG. 6, one embodiment of a method for utilizing a CRL apparatus on a crane is shown. The methodology starts at block 300 with the CRL apparatus located on a crane and in communication with a cloud-based CRL server having access to a CRL database. At decision block 302, if the crane is in a designated operational mode and prepared for lifting then the methodology advances to block 304, where operator information is collected and sent to the CRL server. At block 306, an operational notification with the operator information is sent to the CRL server. At block 308, the CRL apparatus receives LMI data, which the CRL apparatus sends to the CRL server with data analytics at block 310. At decision block 312, if the crane is still in the designated operational mode or modes then the methodology returns to block 308; otherwise, the methodology advances to block 314. The CRL server makes substantially real-time and current crane data available for analysis so that both operator performance and crane function may be established and evaluated. This occurs at block 314 prior to a crane report being generated at block 316 and an operator report being generated at block 318. The methodology ends at block 320.

The order of execution or performance of the methods and techniques illustrated and described herein is not essential, unless otherwise specified. That is, elements of the methods and techniques may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description.

It is, therefore, intended that the appended claims encompass any such modifications or embodiments.

What is claimed is:

1. A crane risk logic apparatus for a crane, the crane risk logic apparatus comprising:
   a housing securing a load moment indicator input, a processor, memory, a global positioning system unit, and a wireless transceiver thereat, the load moment indicator input being configured to interface with a load moment indicator secured to the crane and receive crane data therefrom;
   a busing architecture communicatively interconnecting the load moment indicator input, the processor, the memory, the global positioning system unit, and the wireless transceiver; and
   the memory accessible to the processor, the memory including processor-executable instructions that, when executed, cause the processor to:
     receive the crane data at the load moment indicator input,
     identify, based on the received crane data, lift angle data for each crane lift cycle,
     identify, based on the received crane data, a load amount and allowable capacity data for each of the crane lift cycles,
     identify, based on the received crane data, operator override data for each of the crane lift cycles,
     identify, based on the received crane data, anti-two-block activation data for each of the crane lift cycles,
     store data analytics, the data analytics including at least one of the lift angle data, the allowable capacity data, the operator override data, and the anti-two-block activation data, and
     send the data analytics to a server, the server being a cloud-based server servicing a plurality of crane risk logic apparatuses.

2. The crane risk logic apparatus as recited in claim 1, wherein the data analytics inform a crane operator evaluation.

3. The crane risk logic apparatus as recited in claim 1, wherein the data analytics inform a crane maintenance schedule for the crane.

4. The crane risk logic apparatus as recited in claim 1, wherein the housing is integral with the crane.

5. The crane risk logic apparatus as recited in claim 1, wherein the housing is integral with the crane, the crane being one of a mobile crane and crawler crane.

6. The crane risk logic apparatus as recited in claim 1, wherein the housing is integral with the crane, the crane being a tower crane.

7. The crane risk logic apparatus as recited in claim 1, wherein the crane data further comprises data selected from the group consisting of crane geometrical data, main boom length, main boom angle, jib angle, jib length, operating mode, weight of load on a hook of the crane, and total weight being lifted by the crane.

8. The crane risk logic apparatus as recited in claim 1, wherein the memory accessible to the processor further comprises processor-executable instructions that, when executed, cause the processor to identify, based on the received crane data, operational time data for each of the crane lift cycles.

9. The crane risk logic apparatus as recited in claim 1, wherein the memory accessible to the processor further comprises processor-executable instructions that, when executed, cause the processor to identify, based on the received crane data, lift cycle count data.

10. The crane risk logic apparatus as recited in claim 1, wherein the memory accessible to the processor further comprises processor-executable instructions that, when executed, cause the processor to identify, based on the received crane data, lift classification data for each of the crane lift cycles.

11. The crane risk logic apparatus as recited in claim 1, wherein the memory accessible to the processor further comprises processor-executable instructions that, when executed, cause the processor to identify, based on the received crane data, slewing speed data for each of the crane lift cycle.

12. The crane risk logic apparatus as recited in claim 1, wherein the memory accessible to the processor further comprises processor-executable instructions that, when executed, cause the processor to identify, based on the received crane data, wind speed data for each of the crane lift cycle.

13. The crane risk logic apparatus as recited in claim 1, wherein the memory accessible to the processor further comprises processor-executable instructions that, when executed, cause the processor to identify, based on the received crane data, warning message data for each of the crane lift cycle.

14. The crane risk logic apparatus as recited in claim 1, wherein the memory accessible to the processor further comprises processor-executable instructions that, when executed, cause the processor to identify, based on the received crane data, error message data for each of the crane lift cycle.

15. The crane risk logic apparatus as recited in claim 1, wherein the memory accessible to the processor further comprises processor-executable instructions that, when executed, cause the processor to identify, based on the received crane data, winch direction and speed data for each of the crane lift cycle.

\* \* \* \* \*